Dec. 22, 1925.  A. ANDERSON  1,566,569
AUTOMOBILE BRAKE
Filed March 20, 1922   2 Sheets-Sheet 1
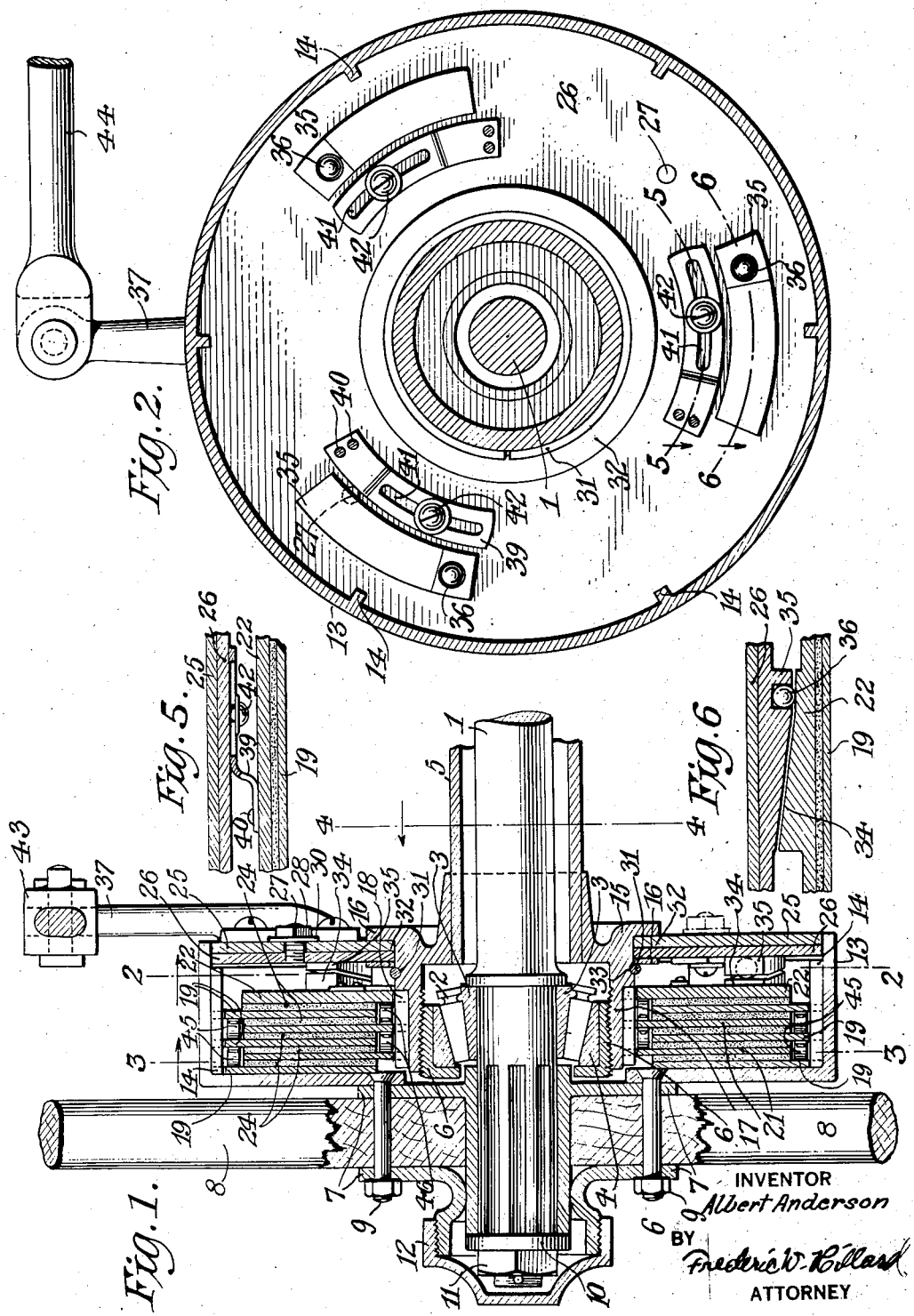

Dec. 22, 1925.
A. ANDERSON
AUTOMOBILE BRAKE
Filed March 20, 1922
1,566,569
2 Sheets-Sheet 2
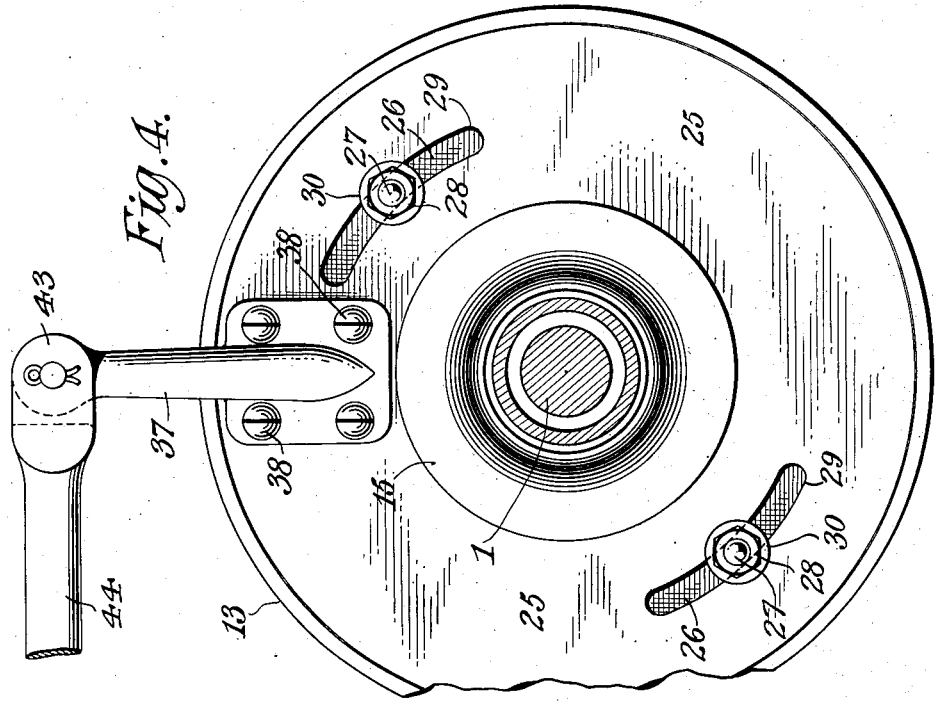
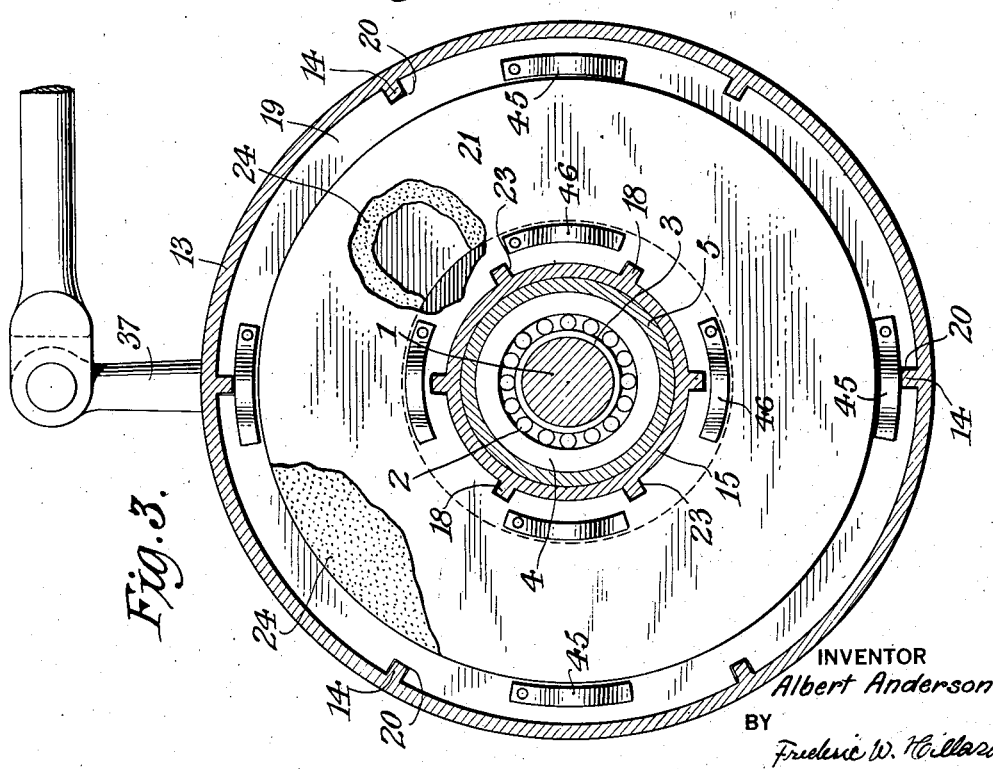
INVENTOR
Albert Anderson
BY
Frederic W. Hillard
ATTORNEY Patented Dec. 22, 1925.

1,566,569

UNITED STATES PATENT OFFICE.

ALBERT ANDERSON, OF TOTTENVILLE, NEW YORK.

AUTOMOBILE BRAKE.

Application filed March 20, 1922. Serial No. 545,139.

*To all whom it may concern:*

Be it known that I, ALBERT ANDERSON, a citizen of the United States of America, and a resident of Tottenville, in the county of Richmond and State of New York, have invented certain new and useful Improvements in Automobile Brakes, of which the following is a specification.

My invention is an improvement in automobile brakes, consisting of a multiple disc brake means. The advantages of my improvement reside first, in that there is a greatly increased brake surface over that of the external and internal band brakes heretofore in use. This results in greatly increased braking power and also in a far longer life to the brake and less frequent adjustment. Hence the brakes are more reliable, being constantly in order as will be understood by all owners and drivers of automobiles.

Secondly the strain is distributed equally over all the brake discs and does not apply with any greater force on one disc than on any other disc. A third important advantage is that when the braking pressure is removed the wheel will turn with perfect freedom since the discs are held apart by springs provided for the purpose and hence can not drag on each other. These springs also prevent rattling of the brake discs when out of use.

While the band brakes heretofore in use are provided with light springs to hold the band normally off from the wheel, the weight of the band always, when out of use, rests on the springs and thus weakens the springs or reduces their tension, with the result that frequently, when out of use, the band drags on the wheel, as is well known and a great source of annoyance. When such springs thus become weakened and lose their tension, so that the band drags normally on the wheel, friction is caused thereby and heat and occasionally even fire. Thus such band brakes are dangerous as well as disagreeable. Also when the springs have become weakened so that the band drags on the wheel, the band becomes mis-shapen and it is almost impossible to adjust it correctly or to hold it in proper adjustment.

In my present multiple disc brake the discs are flat and always come flat together, so that they can not lose their proper shape and this constitutes a fourth important advantage. Since the discs naturally always hold their proper shape they are always easily adjusted. Furthermore the springs when normally holding the discs apart in the disuse of the device, are under little or no tension and are only put under tension as the brake is applied. Hence they do not become weakened or lose their tension as in the case of the said prior devices, this constituting still a fifth important advantage. A still further or sixth advantage in my device consists in that a plurality of discs, three being shown, is locked securely against turning, while the intermediate or intervening, alternate discs are securely locked for turning with the wheel. As shown, each of the six discs is locked (alternate discs to turn and to remain stationary relatively to the turning movement of the wheel) by a plurality of splines and key slots or keys and slots (six being shown on each disc).

This multiplicity of splines and key slots constitutes in itself also a separate or seventh independent advantage, for the reason that in the said prior band brakes there is usually a single anchorage point only and if this single anchorage gives away both brakes (i. e., the one on each wheel become useless. I can employ any number of key seats and splines, because my discs are intended to slide endwise toward each other to compress them for braking and to slide endwise away from each other to normally release them and my splines and key ways merely control the rotary motion.

In the drawings which constitute a part of the specification:

Figure 1 is a side view, partly in section, of my brake assembled on the wheel of the automobile.

Figure 2 is a sectional front view as seen looking inward on the line 2—2 in Fig. 1.

Figure 3 is a sectional front view as seen looking inwardly on the lines 3—3 in Fig. 1.

Figure 4 is a rear view of the brake mechanism, of a view looking outwardly from within on the lines 4—4 of Fig. 1.

Figure 5 is a detail view of one of the three springs (as shown) which permit the opening and closing for compression of the brake discs relatively to the operating disc.

Figure 6 is a sectional view of one of the cams (three being shown) for releasing or compressing the brake discs.

The axle 1 is mounted on roller bearings 2. These roller bearings are inserted between cone bearing 3 on the axle and the outer cone 4 held in the housing 5, the usual adjusting means 6 being provided to take up looseness and lost motion. Mounted on the axle is hub 7 to which is fastened the wheel 8 by means of the usual hub bolts 9. At the end of the axle 1 is the spacing washer 10 and axle nut 11, over which screws onto the hub 7 the hub cap 12. All the foregoing is the usual construction, well known in the art and hence needs no further description.

My brake comprises the brake drum 13. This is rigidly bolted upon the hub 7 by means of the hub bolts 9. The brake drum is provided with the inwardly projecting keys 14 (six being shown). Upon the housing 5 is rigidly mounted the brake hub 15. The hub 15 is provided with the shoulder 16 for purposes to be hereinafter described and with the tubular portion 17 extending outwardly (Fig. 1) and housing the adjusting means 6 for an adjustable movement therein (by threaded means as shown) for the take up of the roller bearings 3. Upon the outer periphery of the tubular portion 17 keys 18 are provided (six being shown).

The revolving brake discs 19 are provided with key slots 20 which take over the keys 14 when the discs 19 are slid into place within the drum 13. Three revolving brake discs are shown, as illustrating one structure, and they are all alike. There is an equal number of stationary brake discs. Two of these discs 21 are alike and the inner one 22 is different, because means have to be provided on the latter for compressing all the discs together to apply the brake. Each of the stationary brake discs 21 and 22 is provided with the key slots 23 to take over the keys 18 of hub 15.

It will thus be seen that the discs 19 revolve with the wheel, since keyed to the drum 13, which latter is bolted upon the wheel, and that the discs 21, 22 are held stationary with the hub since keyed thereto, the hub being rigidly fastened upon the housing 5. Between the opposing faces of each of the revolving and non-revolving keyed discs 19, 21 and 22 there is inserted an annular loosely mounted frictional brake lining 24. I do not intend to limit myself to any particular friction material for such brake linings. The operating disc comprises two plates 25 and 26. On the side of disc 25 facing outwardly or toward the wheel 8 there is a second parallel annular disc 26. This disc is of the same external and internal diameter as disc 25. The discs 25 and 26 are bolted together by the bolts 27 with the nuts 28. It will thus be seen that the operating disc is a compound one, comprising the parts 25 and 26. The bolts 27 are rigidly secured in disc 26 and pass freely through the concentric slots 29 in disc 25. Discs 25 and 26 are both mounted upon the tubular portion 17 of the hub 15, with the disc 25 up against the shoulder 16 and the disc 26 next the disc 25. These discs are of an external diameter very slightly less than the internal diameter of drum 13, so that they may act as dust washers while still permitting the drum to turn freely thereover.

The slots 29 provide means for adjusting disc 26 forward or rearwardly relative to disc 25. This adjustment is for the purpose of setting the brake, as will be more fully described hereinafter, and when the brake has been properly set the disc 26 is securely clamped to disc 25 by tightening up securely the bolts 27, nuts 28 and washers 30. After the discs 25 and 26 have been slipped into place up against shoulder 16 of hub 15, the thrust washer 32 and split wire ring 31 are inserted, the ring being snapped into groove 33 of hub 15 to hold discs 25 and 26 and the thrust washer in place.

Upon the inwardly facing side of disc 22 (or the side facing away from the wheel) are three cams 34, two being shown in Fig. 1. These cams are rigidly secured on the disc. In line therewith on the disc 26 are the three ball retainers 35 for the three anti-friction balls 36. The cams 34 and 35 may be beveled in parallelism with each other and the one slide upon the other to effect the camming, but the use of the balls 36 as shown is preferable as it greatly reduces the friction, thus making the camming more effective, and more or less camming may be had with larger or smaller balls.

As the balls 36 roll up cam face 34 they wedge disc 22 away from discs 25 and 26 thus pressing discs 19, 21 and 22 and the independent annular brake linings together and against the drum 13. This causes the setting of the brake, the operating lever 37 being rigidly fastened upon disc 25 by screws or rivets 38 for that purpose. Since the operating lever 37 is rigidly fastened upon the operating plate 25, the operation of the plate always starts from a fixed point. On the other hand, since plate 26 can be shifted and advanced or retracted relatively to plate 25, by slots 29, as above described, the cam plates 35 and anti-friction balls 36 may be shifted relatively to operating lever 37, with the result that ball 36 may normally occupy the position shown in Fig. 6 or one in advance thereof or retracted therefrom, as may be desired; or it may be necessary to so shift the cam blocks 35 relatively to the operating lever 37 to allow for varying thicknesses of parts as will now be described. Such adjustment between operating lever 37 and cam blocks 35 allows for all manufacturing and service requirements.

As a manufacturing proposition the thickness of the keyed discs 19, 21 and 22 will vary more or less, as well as the thickness of the independent annular brake lining; and these parts will wear thinner from use. Also the distance from the shoulder 16 to the face of drum 13 will vary in different brakes and the thickness of plates 25 and 26 will vary more or less. My device permits of compensation by adjustment for such variations of manufacture or wear, and it also enables me to vary the timing of the cam blocks 35 upon cam blocks 34 and the extent of travel of balls 36 up the inclined face of cam block 34.

The superimposing of plate 26 upon plate 25 is of much importance in another respect, namely that it doubles the resistance of the operating disc to the thrust exerted thereon by the setting of the brake. The means at the hub for sustaining such thrust is the shoulder 16 of the brake hub 15. But such shoulder is in line with the hub 7 of the wheel 8. The brake could not be applied to good advantage at that point, because the turning movement is too slow, as well as for lack of room for the operating parts and particularly because the braking surface of the frictional linings and discs would be too small. Hence for all these reasons I preferably make my braking means of considerable diameter and place my cam blocks 34 and 35 well away from the hub. Hence the resistance of the operating disc itself against buckling or bending away from the keyed discs and face of the drum, must largely sustain the thrust and the added strength of plate 26 superimposed against the thrust on plate 25, practically doubles such resistance.

Upon the disc 22 are riveted the bent, curved and slotted springs 39, by rivets 40. When the brake is applied and the balls 36 are caused to roll up the cams 34 by the revolving movement of the disc 26 clockwise as seen in Fig. 2, the disc 22 is thereby cammed away from the disc 26 and the shouldered screws 42 move clockwise in slots 41, the springs 39 being at the same time flexed or bent by the camming of the disc 22 away from disc 26, so that on release of the operating lever 37 the springs 39 will tend to unflex, moving the screws anti-clockwise in slots 41, thus causing the balls 36 to run down cams 34 and so restoring the parts to normal position, this action being materially assisted by springs 45 and 46, about to be described.

The operating lever 37 is provided at its free, swinging end with the clevis 43 for connection with pull bar 44, the latter being connected with the usual means, not shown, for applying the brake by foot or hand. The revolving brake discs 19 are provided near their outer periphery with the curved compression springs 45 riveted thereon for pressing the discs away from each other when out of use, to avoid all friction, and the stationary discs 21 are provided near their inner periphery with similar springs 46 for the same purpose. By means of the springs 45 and 46 the independent frictional brake linings 24 are held out of pressing contact with the discs when the brake is out of use.

In a very simple form my brake may consist of a single non-revolving disc (as for example one disc 22) and a single revolving disc (as for instance disc 19 next the adjacent face of drum 13). Even the disc next the face of the drum may be dispensed with and the face of the drum may be employed as the revolving disc. For structural reasons, however, it is preferable to insert a revolving disc next the drum, one reason being so as not to cause wear on the face of the drum and another being that the face of the drum is liable to become more or less warped in being bolted to the wheel, so that an adjacent disc (as 19) is apt to present a better braking surface.

Having thus described my invention what I claim and desire to secure by Letters Patent is as follows:

1. An automobile brake comprising, with a wheel and a relatively fixed brake hub, an annular brake drum mounted to turn with the wheel, an annular disc next to the drum and keyed thereto, an intermediate disc slidably keyed to the hub, an annular brake lining loosely mounted between the two discs, an operating disc having a limited revolving movement on the hub, pressure means between the operating disc and the intermediate disc and means to turn the operating disc to press the keyed discs and the brake lining together against the drum.

2. An automobile brake comprising, with a wheel and a relatively fixed brake hub, an annular brake drum mounted to turn with the wheel, a series of annular discs slidably keyed to the drum, a series of intermediate discs slidably keyed to the hub, a series of annular brake linings loosely mounted between the discs, an operating disc having a limited revolving movement on the hub, pressure means between the operating disc and the said intermediate disc adjacent thereto and means to turn the operating disc to press the keyed discs and the said independent annular brake linings together and against the drum.

3. In an automobile brake the combination, with a wheel and a relatively fixed brake hub, an annular brake drum mounted to turn with the wheel, an annular disc slidably keyed to the hub, a brake lining between the disc and the drum, of a compound operating disc having a limited revolving movement on the hub, pressure means between the operating disc and the slidably keyed disc, means to turn the operating disc to press the keyed disc and the brake lining together against the drum and adjusting means in the operating disc to vary the action of the operating disc on the pressure means.

4. In an automobile brake the combination, with a wheel and a relatively fixed brake hub, an annular brake drum mounted to turn with the wheel, an annular disc next the drum and keyed thereto, an intermediate disc slidably keyed to the hub and brake lining between the two discs, of a compound operating disc having a limited revolving movement on the hub, pressure means between the operating disc and the intermediate disc, means to turn the operating disc to press the two discs and the brake lining together against the drum and adjusting means in the operating disc to vary the action of the operating disc on the pressure means.

5. In an automobile brake the combination, with a wheel and a relatively fixed brake hub, an annular brake drum mounted to turn with the wheel, a series of annular discs slidably keyed to the drum, a series of intermediate discs keyed to the hub, brake linings between the discs, of a compound operating disc having a limited revolving movement on the hub, pressure means between the operating disc and the keyed discs, means to turn the operating disc to press the keyed discs and the brake linings together against the drum and adjusting means in the operating disc to vary the action of the operating disc on the pressure means.

6. The combination, in an automobile brake, of two series of concentric, parallel, annular discs comprising revolving discs and intermediate non-revolving ones, independent loosely mounted annular brake linings between the discs, springs to normally hold the discs apart and means to press the discs and the brake linings together to set the said independent brake.

7. In an automobile, the combination with a wheel and a relatively stationary brake hub, of a brake comprising two series of parallel annular discs, the discs in one series alternating with those of the other series, intermediate and independent annular brake linings between the several discs, means for slidably keying one series of discs to the wheel, means for slidably keying the other series to the hub and means for pressing the several discs and the brake linings together to set the said independent brake.

8. In an automobile, the combination with a wheel and a relatively stationary brake hub, of a brake comprising two series of parallel annular discs, the discs in one series alternating with those of the other series, an intermediate series of independent loosely mounted annular brake linings between the several discs, means for slidably keying one series of discs to the wheel, means for slidably keying the other series to the hub, means for pressing the several discs and the brake linings together to set the brake and means for normally holding the discs and brake linings free of each other.

9. An automobile brake, comprising with a wheel and a relatively fixed brake hub, an annular brake drum mounted to turn with the wheel, an annular disc slidably keyed to the hub, a brake lining between the disc and the drum, a compound operating disc comprising an annular plate mounted on the hub for a limited turning movement thereon and having an operating lever and a parallel annular disc provided with a limited independent turning movement relatively to the plate and with means for clamping it to the plate and also with means for pressing the keyed disc and the brake lining against the drum to set the brake, the timing of such pressure movement being regulated by the set position of the pressure means relatively to the operating lever.

10. An automobile brake, comprising with a wheel and a relatively fixed brake hub, an annular brake drum mounted to turn with the wheel, an annular disc slidably keyed to the hub, an intermediate disc slidably keyed to the drum, a brake lining between the two discs, a compound operating disc comprising an annular plate mounted on the hub for a limited turning movement thereon, an operating lever for the plate and an annular parallel disc provided with a limited independent turning movement relatively to the plate and with means for clamping it to the plate and also with means for pressing the keyed discs and the brake lining together against the drum to set the brake, the timing of such pressure movement being regulated by the set position of the pressure means relatively to the operating lever.

11. An automobile brake, comprising with a wheel and a relatively fixed brake hub, a brake drum mounted to turn with the wheel, a series of annular discs slidably keyed to the drum, a series of intermediate discs slidably keyed to the hub, brake linings between the discs, a compound operating disc comprising an annular plate mounted on the hub for a limited turning movement thereon, an operating lever for the plate and a parallel annular disc provided with a limited independent movement on the plate and with means for clamping it to the plate and also with means for pressing the keyed discs and the brake linings together against the drum to set the brake, the timing of such pressure movement being regulated by the set position of the pressure means relatively to the operating lever.

12. In an automobile brake, comprising alternate revolving and non-revolving annular brake discs and brake lining therefor, the combination with a wheel and a relatively fixed brake hub, of a rigidly mounted brake drum on the wheel, a compound operating disc consisting of an annular plate mounted on the hub for a limited turning movement thereon, an operating lever for the plate and a parallel annular disc provided with a limited independent turning movement on the plate and with means for clamping it to the plate and also with means for pressing the brake discs and the brake linings together against the drum to set the brake, the timing of the pressure movement varying with the set position of the said parallel disc on the operating plate.

In witness whereof I have affixed my signature.

ALBERT ANDERSON.